US012799291B2

(12) United States Patent
Hustad et al.

(10) Patent No.: US 12,799,291 B2
(45) Date of Patent: Nov. 17, 2026

(54) INFILTRATED THREE-DIMENSIONAL ARTICLES AND METHODS OF MAKING SAME

(71) Applicant: Solventum Intellectual Properties Company, Maplewood, MN (US)

(72) Inventors: Phillip D. Hustad, St. Paul, MN (US); Benjamin C. Mac Murray, Minneapolis, MN (US)

(73) Assignee: Solventum Intellectual Properties Company, Eagan, MN (US)

( * ) Notice: Subject to any disclaimer, the term of this patent is extended or adjusted under 35 U.S.C. 154(b) by 195 days.

(21) Appl. No.: 18/682,800

(22) PCT Filed: Jul. 18, 2022

(86) PCT No.: PCT/IB2022/056587
§ 371 (c)(1),
(2) Date: Feb. 9, 2024

(87) PCT Pub. No.: WO2023/031693
PCT Pub. Date: Mar. 9, 2023

(65) Prior Publication Data

US 2024/0343004 A1 Oct. 17, 2024

Related U.S. Application Data

(60) Provisional application No. 63/239,066, filed on Aug. 31, 2021.

(51) Int. Cl.
*C08J 7/04* (2020.01)
*B29C 64/135* (2017.01)
(Continued)

(52) U.S. Cl.
CPC ............... *C08J 7/04* (2013.01); *B29C 64/135* (2017.08); *B29C 64/30* (2017.08);
(Continued)

(58) Field of Classification Search
None
See application file for complete search history.

(56) References Cited

U.S. PATENT DOCUMENTS 5,248,456 A 9/1993 Evans, Jr.
6,964,999 B1 * 11/2005 Nakagawa ................ C08F 8/14 525/61

(Continued)

FOREIGN PATENT DOCUMENTS

EP 3157722 B1 6/2022
WO 2015200189 A1 12/2015

(Continued)

OTHER PUBLICATIONS

Chen, Mao, et al. "Living Additive Manufacturing: Transformation of Parent Gels Into Diversely Functionalized Daughter Gels Made Possible by Visible Light Photoredox Catalysis", ACS Central Science, 2017, pp. 124-134, vol. 3, No. 2, https://doi.org/10.1021/acscentsci.6b00335.

(Continued)

*Primary Examiner* — Chinessa T. Golden

(57) ABSTRACT

Infiltrated three-dimensional articles are provided. An article includes a first polymeric material having an exterior surface and an interior volume; and a second polymeric material that is a thermoplastic polymer or a reaction product of a polymerizable composition disposed in at least a portion of the interior volume of the first polymeric material to a depth from the exterior surface. Methods of making the articles are provided. A method includes curing a photopolymerizable composition containing at least one reactive component and at least one photoinitiator to form an additive manufactured three-dimensional structure of a first polymeric material having an exterior surface and an interior volume. The method further includes contacting at least a portion the three-dimensional structure with a fluid to form an infiltrated (Continued)

structure; and curing or drying the fluid of the infiltrated structure to form an infiltrated three-dimensional article.

17 Claims, 7 Drawing Sheets

(51) Int. Cl.

| | |
|---|---|
| ***B29C 64/30*** | (2017.01) |
| ***B29C 71/00*** | (2006.01) |
| ***B33Y 10/00*** | (2015.01) |
| ***B33Y 40/00*** | (2020.01) |
| ***B33Y 80/00*** | (2015.01) |
| *B29K 101/12* | (2006.01) |

(52) U.S. Cl.
CPC .......... *B29C 71/0009* (2013.01); *B33Y 10/00* (2014.12); *B33Y 40/00* (2014.12); *B33Y 80/00* (2014.12); *B29K 2101/12* (2013.01); *B29K 2995/0012* (2013.01); *B29K 2995/0018* (2013.01); *B29K 2995/0097* (2013.01)

(56) References Cited

U.S. PATENT DOCUMENTS

| | | | | |
|---|---|---|---|---|
| 9,205,601 | B2 | 12/2015 | DeSimone et al. | |
| 9,360,757 | B2 | 6/2016 | DeSimone et al. | |
| 9,453,142 | B2 | 9/2016 | Rolland | |
| 10,350,823 | B2 | 7/2019 | Rolland | |
| 10,759,116 | B2 | 9/2020 | Wynne | |
| 2012/0077038 | A1* | 3/2012 | Pyles | B32B 27/16 428/521 |
| 2016/0136889 | A1 | 5/2016 | Rolland | |
| 2016/0137838 | A1 | 5/2016 | Rolland | |
| 2016/0160077 | A1 | 6/2016 | Rolland | |
| 2019/0283315 | A1* | 9/2019 | Feller | B22F 10/12 |

FOREIGN PATENT DOCUMENTS

| | | | |
|---|---|---|---|
| WO | 2018119026 | A1 | 6/2018 |
| WO | 2019023009 | | 1/2019 |
| WO | 2019025869 | A1 | 2/2019 |
| WO | 2019103855 | | 5/2019 |
| WO | 2019175716 | A1 | 9/2019 |
| WO | 2020005413 | A1 | 1/2020 |
| WO | 2020104873 | A1 | 5/2020 |

OTHER PUBLICATIONS

Chen, Mao,.et al. "Visible-Light-Controlled Living Radical Polymerization From a Trithiocarbonate Iniferter Mediated by an Organic Photoredox Catalyst", ACS Macro Letters, 2015, p. 566-569, vol. 4, No. 5,. https://doi.org/10.1021/acsmacrolett.5b00241.

International Search Report for PCT International Application No. PCT/IB2022/056587, mailed on Oct. 26, 2022, 5 pages.

Lee, Corissa K et al. "Solvent Swelling Activation of a Mechanophore in a Polymer Network", Macromolecules, 2014, p. 2690-2694, vol. 47.8, https://doi.org/10.1021/ma500195h.

Matsumoto, Akikazu, et al. "Synthesis And Thermal Properties of Poly(Cycloalkyl Methacrylate)S Bearing Bridged- and Fused-Ring Structures", Journal of Polymer Science. Part A, Polymer Chemistry, 1993, pp. 2531-2539, vol. 31, No. 10, https://doi.org/10.1002/pola.1993.080311014.

* cited by examiner a) Selectively cure a photopolymerizable composition comprising at least one reactive component and at least one photoinitiator to form an additive manufactured three-dimensional structure of a first polymeric material having an exterior surface and an interior volume

510

↓ b) Contact at least a portion of the three-dimensional structure with a fluid to form an infiltrated structure

520

↓ c) Cure or dry the fluid of the infiltrated structure to form an infiltrated three dimensional article comprising a second polymeric material disposed in at least a portion of the interior volume of the first polymeric material

530

FIG. 5

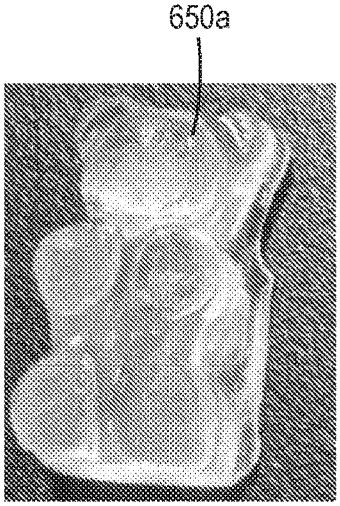

FIG. 6A

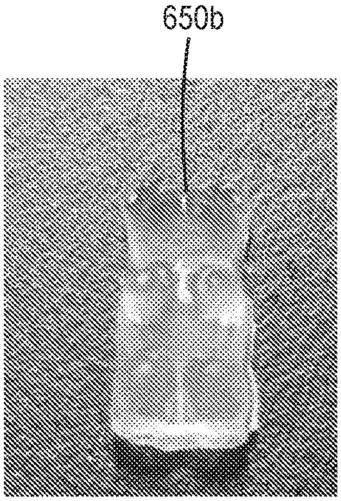

FIG. 6B

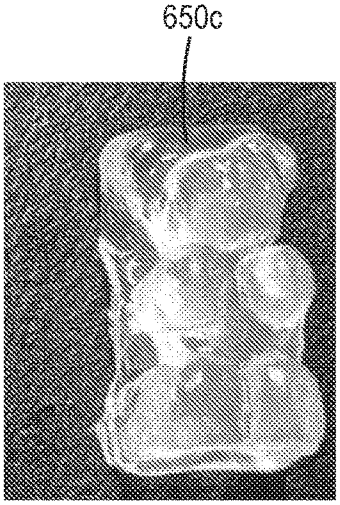

FIG. 6C

INFILTRATED THREE-DIMENSIONAL ARTICLES AND METHODS OF MAKING SAME

CROSS REFERENCE TO RELATED APPLICATIONS

This application is a national stage filing under 35 U.S.C. 371 of PCT/IB2022/056587, filed Jul. 18, 2022, which claims the benefit of U.S. Provisional Application No. 63/239,066, filed Aug. 31, 2021, the disclosures of each of which are incorporated by reference herein in their entireties.

FIELD

The present disclosure generally relates to three-dimensional articles, e.g., formed in part using additive manufacturing.

SUMMARY

In a first aspect, an infiltrated three-dimensional article is provided. The three-dimensional article includes a) a first polymeric material having an exterior surface and an interior volume; and b) a second polymeric material that is a thermoplastic polymer or a reaction product of a polymerizable composition disposed in at least a portion of the interior volume of the first polymeric material to a depth of at least 0.1 millimeters (mm) from the exterior surface.

In a second aspect, a method of making an infiltrated three-dimensional article is provided. The method includes a) curing a photopolymerizable composition including at least one reactive component and at least one photoinitiator to form an additive manufactured three-dimensional structure of a first polymeric material having an exterior surface and an interior volume. The method further includes b) contacting at least a portion the three-dimensional structure with a fluid to form an infiltrated structure; and c) curing or drying the fluid of the infiltrated structure to form an infiltrated three-dimensional article. The three-dimensional article includes a second polymeric material disposed in at least a portion of the interior volume of the first polymeric material.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples may be used in various combinations. In each instance, the recited list serves only as a representative group and should not be interpreted as an exclusive list.

BRIEF DESCRIPTION OF THE DRAWINGS

FIG. 5 is a flow chart of an exemplary method according to the present disclosure.

FIG. 6*a* is a photograph of a three-dimensionally printed part having an intended size.

FIG. 6*b* is a photograph of a three-dimensionally printed part having a compensated, uniformly scaled down, size for use in preparing the exemplary infiltrated three-dimensional article of Example 7.

FIG. 6*c* is a photograph of the exemplary infiltrated three-dimensional article of Example 7.

Figure 1:
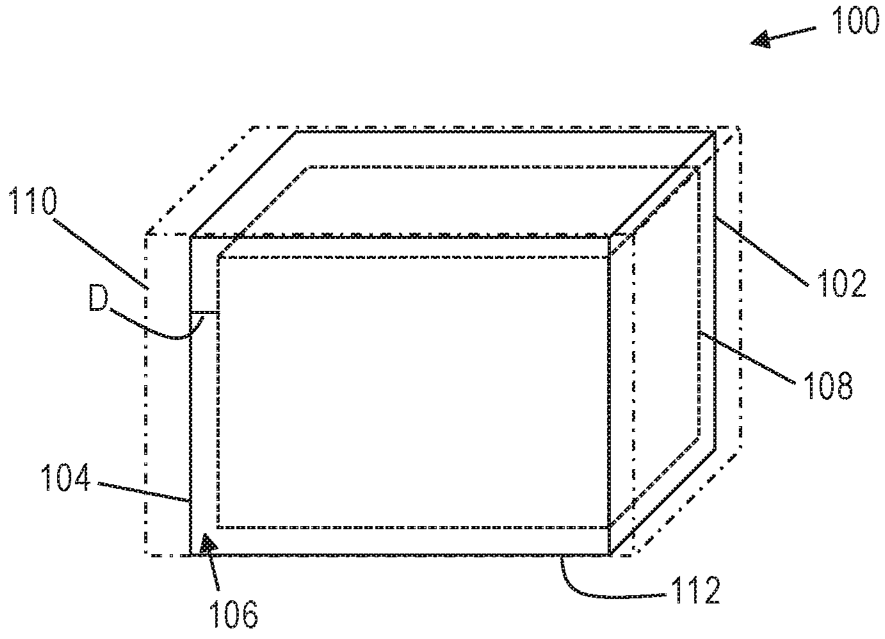
FIG. 1 is a schematic perspective view of an exemplary infiltrated three-dimensional article according to the present disclosure.

While the above-identified figures set forth various embodiments of the disclosure, other embodiments are also contemplated, as noted in the description. In all cases, this disclosure presents the invention by way of representation and not limitation. The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Glossary

As used herein, “aliphatic group” means a saturated or unsaturated linear, branched, or cyclic hydrocarbon group. This term is used to encompass alkyl, alkenyl, and alkynyl groups, for example.

As used herein, “alkyl” means a linear or branched, cyclic or acyclic, saturated monovalent hydrocarbon having from one to thirty-two carbon atoms, e.g., methyl, ethyl, 1-propyl, 2-propyl, pentyl, and the like.

As used herein, “alkylene” means a linear saturated divalent hydrocarbon having from one to twelve carbon atoms or a branched saturated divalent hydrocarbon radical having from three to twelve carbon atoms, e.g., methylene, ethylene, propylene, 2-methylpropylene, pentylene, hexylene, and the like.

As used herein, each of “alkenyl” and “ene” refers to a monovalent linear or branched unsaturated aliphatic group with one or more carbon-carbon double bonds, e.g., vinyl.

As used herein, the term “arylene” refers to a divalent group that is carbocyclic and aromatic. The group has one to five rings that are connected, fused, or combinations thereof. The other rings can be aromatic, non-aromatic, or combinations thereof. In some embodiments, the arylene group has up to 5 rings, up to 4 rings, up to 3 rings, up to 2 rings, or one aromatic ring. For example, the arylene group can be phenylene.

As used herein, “aralkylene” refers to a divalent group that is an alkylene group substituted with an aryl group or an alkylene group attached to an arylene group. The term "alkarylene" refers to a divalent group that is an arylene group substituted with an alkyl group or an arylene group attached to an alkylene group. Unless otherwise indicated, for both groups, the alkyl or alkylene portion typically has from 1 to 20 carbon atoms, 1 to 10 carbon atoms, 1 to 6 carbon atoms, or 1 to 4 carbon atoms. Unless otherwise indicated, for both groups, the aryl or arylene portion typically has from 6 to 20 carbon atoms, 6 to 18 carbon atoms, 6 to 16 carbon atoms, 6 to 12 carbon atoms, or 6 to 10 carbon atoms.

As used herein, the term "essentially free" in the context of a composition being essentially free of a component, refers to a composition containing less than 1% by weight (wt. %), 0.5 wt. % or less, 0.25 wt. % or less, 0.1 wt. % or less, 0.05 wt. % or less, 0.001 wt. % or less, or 0.0001 wt. % or less of the component, based on the total weight of the composition.

As used herein, the term "glass transition temperature" ($T_g$), of a polymer refers to the transition of a polymer from a glassy state to a rubbery state and can be measured using Differential Scanning calorimetry (DSC), such as at a heating rate of 10° C. per minute in a nitrogen stream. When the $T_g$ of a monomer is mentioned, it is the $T_g$ of a homopolymer of that monomer. The homopolymer must be sufficiently high molecular weight such that the $T_g$ reaches a limiting value, as it is generally appreciated that a $T_g$ of a homopolymer will increase with increasing molecular weight to a limiting value. The homopolymer is also understood to be substantially free of moisture, residual monomer, solvents, and other contaminants that may affect the $T_g$. A suitable DSC method and mode of analysis is as described in Matsumoto, A. et. al., J. Polym. Sci. A., Polym. Chem. 1993, 31, 2531-2539.

As used herein, the terms "hardenable" refers to a material that can be cured or solidified, e.g., by heating to remove solvent, heating to cause polymerization, chemical crosslinking, radiation-induced polymerization or crosslinking, or the like.

As used herein, "curing" means the hardening or partial hardening of a composition by any mechanism, e.g., by heat, light, radiation, e-beam, microwave, chemical reaction, or combinations thereof.

As used herein, "cured" refers to a material or composition that has been hardened or partially hardened (e.g., polymerized or crosslinked) by curing.

As used herein, "integral" refers to being made at the same time or being incapable of being separated without damaging one or more of the (integral) parts.

As used herein, "infiltrated" refers to a material that has been permeated by a different material.

As used herein, "interpenetrating polymer network" refers to an entangled structure formed by a first polymer network entering gaps in a second polymer network, either with or without covalent bonding between the first and second polymer networks.

As used herein, the term "(meth)acrylate" is a shorthand reference to acrylate, methacrylate, or combinations thereof, "(meth)acrylic" is a shorthand reference to acrylic, methacrylic, or combinations thereof, and "(meth)acryl" is a shorthand reference to acryl and methacryl groups. "Acryl" refers to derivatives of acrylic acid, such as acrylates, methacrylates, acrylamides, and methacrylamides. By "(meth)acryl" is meant a monomer or oligomer having at least one acryl or methacryl groups and linked by an aliphatic segment if containing two or more groups. As used herein, "(meth)acrylate-functional compounds" are compounds that include, among other things, a (meth)acrylate moiety.

As used herein, "fluorinated polymer" refers to any organic polymer containing fluorine.

As used herein, the term or prefix "micro" refers to at least one dimension defining a structure or shape being in a range from 1 micrometer to 1 millimeter. For example, a microstructure may have a height or a width that is in a range from 1 micrometer to 1 millimeter.

As used herein, "polymerizable composition" means a hardenable composition that can undergo polymerization upon initiation (e.g., free-radical polymerization initiation). Typically, prior to polymerization (e.g., hardening), the polymerizable composition has a viscosity profile consistent with the requirements and parameters of one or more 3D printing systems. In some embodiments, for instance, hardening comprises irradiating with actinic radiation having sufficient energy to initiate a polymerization or cross-linking reaction. For instance, in some embodiments, ultraviolet (UV) radiation, e-beam radiation, or both, can be used. When actinic radiation can be used, the polymerizable composition is referred to as a "photopolymerizable composition".

As used herein, a "resin" contains all polymerizable components (monomers, oligomers and/or polymers) being present in a hardenable composition. The resin may contain only one polymerizable component compound or a mixture of different polymerizable compounds.

As used herein, "thermoplastic" refers to a polymer that flows when heated sufficiently above its glass transition point and become solid when cooled.

As used herein, "thermoset" refers to a polymer that permanently sets upon curing and does not flow upon subsequent heating. Thermoset polymers are typically crosslinked polymers.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

In this application, terms such as "a", "an", and "the" are not intended to refer to only a singular entity but include the general class of which a specific example may be used for illustration. The terms "a", "an", and "the" are used interchangeably with the term "at least one." The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise.

The term "and/or" means one or all of the listed elements or a combination of any two or more of the listed elements.

Also herein, all numbers are assumed to be modified by the term "about" and preferably by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used. Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

As used herein as a modifier to a property or attribute, the term "generally", unless otherwise specifically defined, means that the property or attribute would be readily recognizable by a person of ordinary skill but without requiring absolute precision or a perfect match (e.g., within +/−20% for quantifiable properties). The term "substantially", unless otherwise specifically defined, means to a high degree of approximation (e.g., within +/−10% for quantifiable properties) but again without requiring absolute precision or a perfect match. Terms such as same, equal, uniform, constant, strictly, and the like, are understood to be within the usual tolerances or measuring error applicable to the particular circumstance rather than requiring absolute precision or a perfect match.

Construction of a three-dimensional object is typically performed in a step-wise or layer-by-layer manner in additive manufacturing techniques. For instance, in "stereolithography," layer formation is performed through solidification of photocurable resin under the action of visible and/or UV light irradiation. Generally, new layers are formed at the top surface of the growing object or new layers are formed at the bottom surface of the growing object. Techniques referred to as "continuous liquid interface production" (or "CLIP") have also been developed; these techniques enable the rapid production of three-dimensional objects in a layerless manner, by which the parts may have desirable structural and mechanical properties.

To broaden the materials properties possible with additive manufacturing, so-called dual cure stereolithography resins suitable for stereolithography techniques (particularly for CLIP) have been developed. These resins usually include a first polymerizable system typically polymerized by light (sometimes referred to as "Part A") from which an intermediate object is produced, and also include at least a second polymerizable system ("Part B") which is usually cured after the intermediate object is first formed, and which imparts desirable structural and/or tensile properties to the final object (see, e.g., U.S. Pat. No. 10,350,823 (Rolland et al.)). However, in many cases, the incorporation of Part B in the resin may have the disadvantage of slowing or complicating the initial stereolithography or CLIP fabrication of the intermediate object.

It has been discovered that parts can be formed in a single, first, resin system and then subsequently treated in a way to infiltrate a second resin system into the part to be further dried and/or cured into a final (infiltrated) object. Infiltrating the second resin system enables use of materials that are challenging to form via additive manufacturing. Infiltrating the second resin system also enables the use of materials having sufficiently similar chemistry to the first resin system to undesirably cure simultaneously during additive manufacturing. In some cases, the second resin system (e.g., a thermoplastic polymer and/or a polymerizable composition) is reacted with the first resin system, whereas in other cases the second resin system makes its own network structure (e.g., lacks covalent bonding with the first resin system). Additionally, the second resin system can be selected to provide one or more various properties to the final object that might have been difficult to impart solely by additive manufacturing of a photocurable resin. For instance, the infiltrant may be chosen to exhibit a different modulus than the first resin system, a different glass transition temperature ($T_g$), a different tackiness, and/or a different optical property.

Infiltrated Three-Dimensional Articles

In a first aspect, an infiltrated three-dimensional article is provided. The article comprises:

a) a first polymeric material having an exterior surface and an interior volume; and b) a second polymeric material that is a thermoplastic polymer or a reaction product of a polymerizable composition disposed in at least a portion of the interior volume of the first polymeric material to a depth of at least 0.1 mm from the exterior surface.

In any embodiment, the first polymeric material may be formed of a plurality of layers directly bonded to each other, e.g., having been formed by a layer-by-layer additive manufacturing technique. In each infiltrated three-dimensional article according to the present disclosure, it is to be understood that the first polymeric material and the second polymeric material differ from each other in some manner and thus do not have identical compositions. Optionally, in any infiltrated three-dimensional article according to the present disclosure, the second polymeric material and the first polymeric material form an interpenetrating polymer network.

Referring to FIG. 1, a schematic perspective view is provided of an exemplary infiltrated three-dimensional article 100. The infiltrated three-dimensional article 100 comprises a first polymeric material 102 having an exterior surface 104 and an interior volume 106; and a second polymeric material 108 disposed in at least a portion of the interior volume 106 of the first polymeric material 102 to a depth D of at least 0.1 mm from the exterior surface 104. For any infiltrated three-dimensional article according to the present disclosure, the depth D is optionally 0.1 mm or greater, 0.2 mm, 0.3 mm, 0.4 mm, 0.5 mm, 0.6 mm, 0.7 mm, 0.8 mm, 0.9 mm, or 1 mm or greater; and at most the depth D is the entire depth of the interior volume of the particular article. For simplicity, the article 100 of FIG. 1 is illustrated as having a rectangular parallelepiped shape; however, the shape of an article to be infiltrated is not limited. Further, in practice the thickness (e.g., height) of each material of an infiltrated article according to the present disclosure is not necessarily even across its length and width, as illustrated in FIG. 1.

In some cases, the second polymeric material is located solely within the interior volume of the first polymeric material (see, e.g., FIGS. 3-4), whereas in other cases, the second polymeric material is additionally located on the exterior surface of the first polymeric material. In the embodiment shown in FIG. 1, the infiltrated article 100 also comprises the second polymeric material 110 disposed on at least a portion of the exterior surface 104 of the first polymeric material 102. More particularly, in this case the second polymeric material 110 is disposed on five sides of the illustrated six-sided rectangular parallelepiped article 100, with the side 112 lacking the second polymeric material. It is to be understood that the second polymeric material 108 has the same composition as the second polymeric material 110; the different reference numbers are used to indicate the location of the second polymeric material in/on the article 100. Any portion of an exterior surface of the first polymeric material may selectively have the second polymeric material disposed on it as desired. When there is second polymeric material located on the exterior surface of the first polymeric material of any infiltrated three-dimensional article according to the present disclosure, it may be formed during infiltration of a thermoplastic polymer or a polymerizable composition into the first polymeric material, and/or it may be separately applied to the exterior surface of the first polymeric material. Optionally, the second polymeric material 110 is disposed on at least a portion of the exterior surface 104 of the first polymeric material 102 in a form of a layer. The layer often has a thickness of 500 micrometers or greater, 600 micrometers, 700 micrometers, 800 micrometers, 900 micrometers, 1 millimeter (mm), 1.25 mm, 1.5 mm, 1.75 mm, or 2 mm or greater. A suitable maximum thickness will vary based on the size of the first polymeric material; typically a thickness of the layer of the second polymeric material is 500% or less of a largest diameter (e.g., height, width, or length) of the first polymeric layer, such as 450% or less, 400%, 350%, 300%, 250%, 200%, 150%, or 100% or less of the largest diameter of the first polymeric layer.

Three-dimensional articles are typically infiltrated by contact of a fluid comprising a thermoplastic polymer and/or a polymerizable composition with (at least a portion of) the exterior surface of the first polymeric layer (followed by drying and/or curing to form the second polymeric material), thus the thermoplastic polymer and/or the polymerizable composition penetrates the exterior surface and is disposed in a portion of the interior volume of the first polymeric material that is located directly adjacent to at least a portion of the exterior surface of the first polymeric material. The distance that the second polymeric material gets infiltrated into the interior volume of the first polymeric material depends on the amount of a thermoplastic polymer or polymerizable composition placed into contact with the first polymeric material, the duration of the contact, and the specific materials used. For instance, the extent of infiltration tends to increase with closer solubility parameters of the two materials and concomitantly tends to decrease with greater disparity between the solubility parameters of the two materials. Often, the amount of the second polymeric material in the interior volume decreases the further into the interior volume from the exterior surface that the second polymeric material is located, e.g., there may be a gradient of the second polymeric material in which the amount of the second polymeric material is largest directly adjacent to the exterior surface and gradually smaller as the distance into the interior volume increases.

The ability for an infiltrant (e.g., a thermoplastic polymer and/or a polymerizable composition) to swell a polymerized resin (e.g., the first polymeric material) is determined by both the interactions between the infiltrant and the polymerized resin and dependent on the chemical structure and polarity of the components reflected in the empirical rule that "like dissolves like". If the chemical structures are similar, the energy of interaction between homogeneous and heterogeneous molecules is reduced and this facilitates infiltration. These factors are often expressed by differences in solubility parameters such as Hildebrand or Hansen solubility parameters or the Flory-Huggins parameter $\chi$, and the network structure of the polymerized resin. According to the Flory-Rechner theory, the degree to which the infiltrant will penetrate is a balance between the entropy of mixing of the polymerized resin and infiltrant, the entropy change caused by reduction in the number of polymer chain conformations of the polymerized resin upon infiltration, and the heat of mixing of the polymerized resin and infiltrant. Infiltration is also a kinetic process, coupling mass transport and mechanical deformation, and the degree to which the polymerized resin is infiltrated, i.e., the depth of penetration into the interior volume, can be controlled using kinetics, e.g., time of exposure to the infiltrant. In any infiltrated three-dimensional article of the present disclosure, optionally the first polymeric material and the thermoplastic polymer or the polymerizable composition of the second polymeric material have a difference of solubility parameters from each other of 35 $MPa^{1/2}$ (i.e., the square root of megapascals) or less, such as 30 $MPa^{1/2}$ or less, 25 $MPa^{1/2}$, 20 $MPa^{1/2}$, 15 $MPa^{1/2}$, 10 $MPa^{1/2}$, or 5 $MPa^{1/2}$ or less; and 0 $MPa^{1/2}$ or more.

Figure 2:
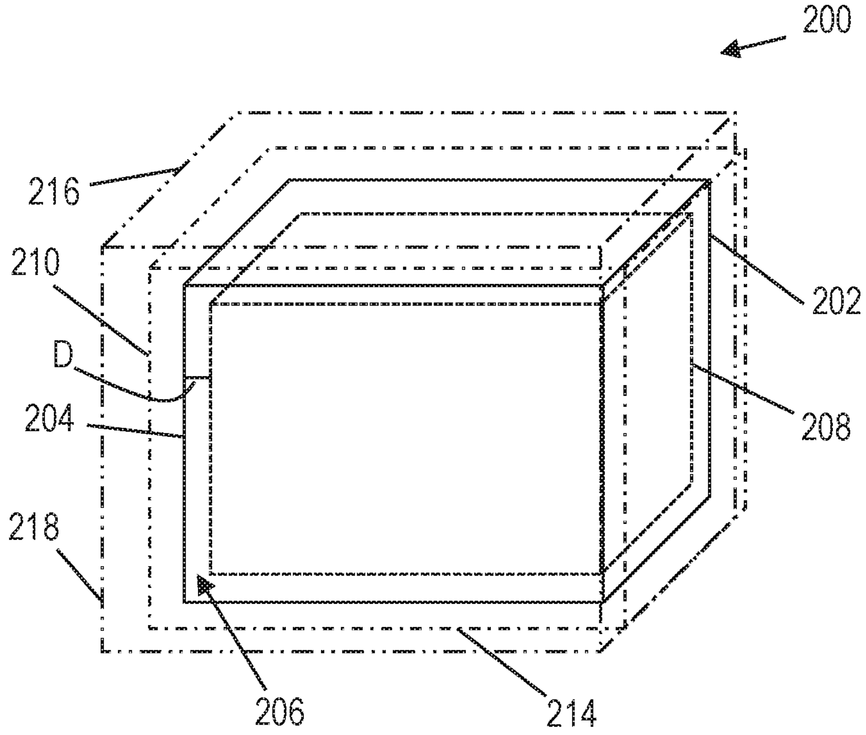
FIG. 2 is a schematic perspective view of another exemplary infiltrated three-dimensional article according to the present disclosure.

Referring to FIG. 2, a schematic perspective view is provided of another exemplary infiltrated three-dimensional article 200. The infiltrated three-dimensional article 200 comprises a first polymeric material 202 having an exterior surface 204 and an interior volume 206; and a second polymeric material 208 disposed in a portion of the interior volume 206 of the first polymeric material 202 to a depth D of at least 0.1 mm from the exterior surface 204. For simplicity, the article 200 of FIG. 2 is illustrated as having a rectangular parallelepiped shape. In the embodiment shown in FIG. 2, the infiltrated article 200 comprises the second polymeric material 208 located in the interior volume 206 of the first polymeric material 202 and the second polymeric material 210 disposed on the exterior surface 204 of the first polymeric material 202. It is to be understood that the second polymeric material 208 has the same composition as the second polymeric material 210; the different reference numbers are used to indicate the location of the second polymeric material in the article 200. In the embodiment of FIG. 2, the second polymeric material 210 is disposed on an entirety of the exterior surface 204 of the first polymeric material 202 in a form of a complete shell (e.g., a continuous layer) surrounding the first polymeric material 202. In the illustration in FIG. 2, the shell of the second polymeric material 210 is shown as being a larger rectangular parallelepiped shape than the first polymeric material 202; however, in many cases a shell of a second polymeric material on a first polymeric material will have one or more variations in its shapes and/or thicknesses due to flow characteristics of the second polymeric material during the infiltration process.

Additionally, in the embodiment of FIG. 2, the second polymeric material 210 comprises an exterior surface 214, and the article 200 further comprises an optional third polymeric material 216 disposed on at least a portion of the exterior surface 214 of the second polymeric material 210. The third polymeric material 216 is different from the second polymeric material 210; they do not have identical compositions.

Figure 3:
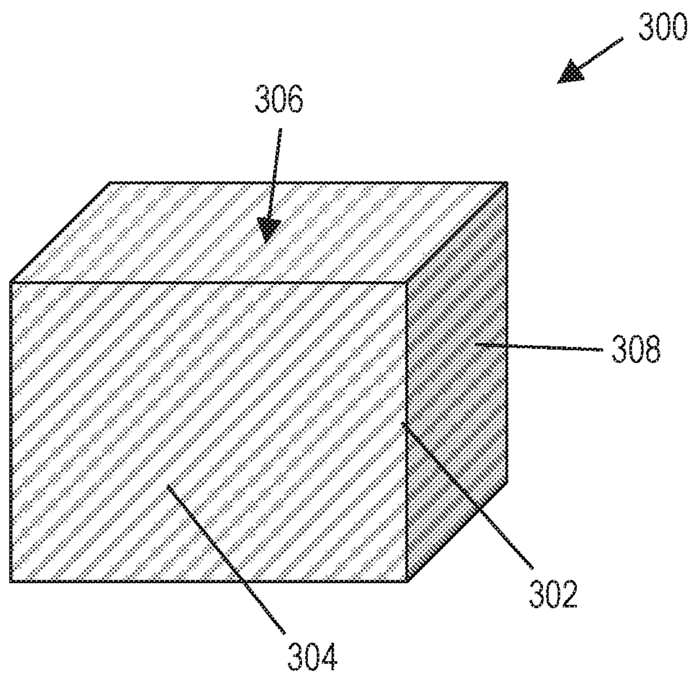
FIG. 3 is a schematic perspective view of a further exemplary infiltrated three-dimensional article according to the present disclosure.

Referring to FIG. 3, a schematic perspective view is provided of a further exemplary infiltrated three-dimensional article 300. The infiltrated three-dimensional article 300 comprises a first polymeric material 302 having an exterior surface 304 and an interior volume 306; and a second polymeric material 308 disposed throughout the interior volume 306 of the first polymeric material 302. Optionally, the article 300 comprises a fully (or substantially fully) homogeneous combination of the first polymeric material 302 and the second polymeric material 308. In this embodiment, the infiltrated three-dimensional article 300 lacks the second polymeric material (or any other polymeric material) disposed on the exterior surface 304 of the article 300.

Figure 4:
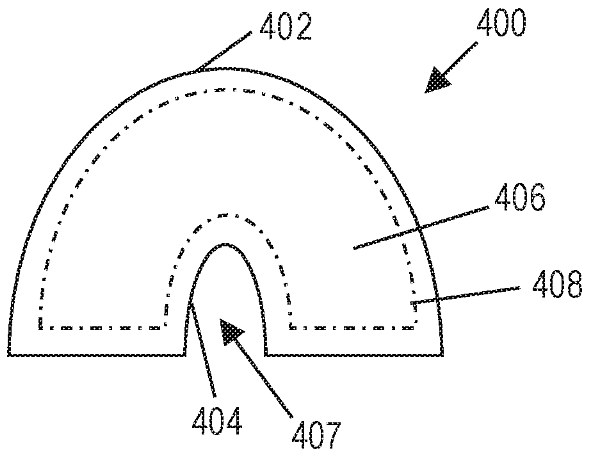
FIG. 4 is a schematic side view of an additional exemplary infiltrated three-dimensional article according to the present disclosure.

Referring to FIG. 4, a schematic cross-sectional view is provided of yet another exemplary infiltrated three-dimensional article 400. The infiltrated three-dimensional article 400 comprises a first polymeric material 402 having an exterior surface 404 and an interior volume 406; and a second polymeric material 408 disposed in a portion of the interior volume 406 of the first polymeric material 402. The infiltrated three-dimensional article 400 of FIG. 4 has a shape that includes a hollow portion (e.g., a portion of the exterior surface 404 is shaped to define a hollow space 407) thus the exterior surface includes the portion of the exterior surface 404 that would be considered being on the inside of the overall infiltrated three-dimensional article 400. In this case, the dotted line indicates that the second polymeric material 408 was contacted with the entire exterior surface 404; however, it is possible for the second polymeric material for any infiltrated article according to the present disclosure to be contacted with a portion of the exterior surface and allowed to infiltrate fully through the interior volume of the article to an opposing portion of the exterior surface. In this embodiment, the infiltrated three-dimensional article 400 lacks the second polymeric material (or any other polymeric material) disposed on the exterior surface 404 of the article 400.

In any article according to the present disclosure, the second polymeric material has a modulus that is at least 10% different than a modulus of the first polymeric material, for instance 10% or more, 15%, 20%, 25%, 30%, 35%, 40%, or 50% or more; and up to 10,000% different than a modulus of the first polymeric material. Advantageously, use of a second polymeric material having a different modulus than the first polymeric material may impart properties to the final article such that the infiltrated article exhibits different rigidity (e.g., hardness), strength, toughness, etc., in various portions of the infiltrated article (e.g., a softer core than exterior when the second polymeric material has a higher modulus than the first polymeric material).

In any article according to the present disclosure, the second polymeric material has a glass transition temperature ($T_g$) that is at least 5 degrees Celsius different than a $T_g$ of the first polymeric material, for instance 5 degrees Celsius or more, 7 degrees Celsius or more, 10 degrees Celsius or more, 12 degrees Celsius or more, 15 degrees Celsius or more, 17 degrees Celsius or more, 20 degrees Celsius or more, 25 degrees Celsius or more, 30 degrees Celsius or more, 35 degrees Celsius or more, 40 degrees Celsius or more, 45 degrees Celsius or more, or 50 degrees Celsius or more; and up to 300 degrees Celsius different than a $T_g$ of the first polymeric material. Many materials that contain two glass transition temperatures are useful, for example providing a combination of ductility and high modulus (e.g., physical integrity).

In any article according to the present disclosure, the second polymeric material exhibits different optical properties than the first polymeric material, such as color, refractive index, and/or transparency. Advantageously, an optical property can be imparted to the infiltrated three-dimensional article that would be difficult to include in a photopolymerizable composition suitable for additive manufacturing processes (e.g., a color that would absorb radiation during photocuring of the composition).

Optionally, the second polymeric material is a pressure-sensitive adhesive. In such embodiments, the second polymeric material is typically included both in the interior volume of the first polymeric material and on the exterior surface of the first polymeric material to impart tackiness to the exterior of the infiltrated three-dimensional article.

Various photopolymerizable compositions are suitable for use to form the first polymeric material and/or the second polymeric material, according to the present disclosure. Such compositions include at least one polymerizable component. The term "component" encompasses compounds, monomers, oligomers, and polymers. A "polymerizable component," for reference purposes herein, comprises a hardenable component that can be cured to provide a printed article. In some embodiments, for instance, hardening comprises irradiating with actinic radiation having sufficient energy to initiate a polymerization or cross-linking reaction. For instance, in some embodiments, ultraviolet (UV) radiation, e-beam radiation, or both, can be used.

First Polymeric Material

Generally, the first polymeric material is formed from a composition that can be selectively photocured in an additive manufacturing process. In some embodiments, the first polymeric material comprises a reaction product of a photopolymerizable composition comprising at least one ethylenically unsaturated component and at least one photoinitiator. The at least one ethylenically unsaturated component of the photopolymerizable composition optionally comprises at least one of a (meth)acryl component, a thiol component and an ene component that is different from the (meth)acryl component, a polyalkylene component, a polyalkylene oxide component, a polyester component, a polycarbonate component, a urethane component, a polyamide component, an epoxide component, or an oxetane component. In select embodiments, an ethylenically unsaturated component of the photopolymerizable composition comprises a (meth)acryl component.

More particularly, in some embodiments, a suitable photopolymerizable composition is selected from the compositions described in co-owned PCT Publication Nos. WO 2020/104873 (Klun et al.); WO 2020/005413 (Klun et al.); WO 2019/175716 (Abuelyaman et al.); WO 2019/103855 (Parkar et al.); WO 2019/023009 (Parkar et al.); and/or WO 2018/119026 (Parkar et al.). These applications are incorporated herein by reference in their entireties. Some suitable commercially available photopolymerizable compositions include, for instance, "Photopolymer Stamp Resin" from JMP Rubber Stamp Materials (Mount Vernon, IL); "PLASCLEAR" from Asiga (Sydney, Australia); and "VEROCLEAR" resin from Stratasys (Eden Prairie, MN).

Second Polymeric Material

In some embodiments, the second polymeric material comprises a thermoplastic polymer. Suitable thermoplastic polymers comprise for instance and without limitation, a polyurethane, a polyurea, a polyester, a polyamide, a polyether, a polycarbonate, a polyimide, a polysulphone, a polyphenylene oxide, a polyacrylate, a polymethacrylate, a polyolefin, a styrene, a styrene based random or block copolymer, a chlorinated polymer, a fluorinated polymer, or copolymers of ethylene and chlorotrifluoroethylene.

In some embodiments, the second polymeric material comprises a reaction product of a polymerizable composition comprising at least one reactive component. The at least one reactive component of the polymerizable composition optionally comprises at least one of a (meth)acryl component, a thiol component and an ene component that is different from the (meth)acryl component, a polyalkylene component, a polyalkylene oxide component, a polyester component, a polycarbonate component, a urethane component, a polyamide component, an epoxide component, an oxetane component, a silicone component, an epoxy component, a cyanate ester component, a natural rubber component, a ring-opening metathesis polymerization component, a click chemistry component (e.g., alkyne monomer(s) in combination with azide monomer(s)), a cyanate ester resin, or precursors to a polyurethane, a polyurea, or a copolymer thereof. When a polymerizable composition is employed, the composition often further comprises at least one of a photoinitiator, a thermal initiator, or a cationic initiator. Some suitable polymerizable compositions include compositions described in the co-owned applications mentioned above. Some suitable reactive components including the epoxide, oxetane, silicone, epoxy, cyanate ester, natural rubber, ring-opening metathesis polymerization, and click chemistry components; cyanate ester resin; or precursors to a polyurethane and/or a polyurea, are as described in U.S. Pat. No. 10,350,823 (Rolland et al.). A suitable commercially available polymerizable composition is "VEROMAGENTA" resin from Stratasys (Eden Prairie, MN).

Optionally, the second polymeric material comprises a combination of a thermoplastic polymer and a reaction product of a polymerizable composition comprising at least one reactive component. In such cases, the presence of the thermoplastic polymer should not interfere with the reaction of the polymerizable composition to form a polymer from the reactive component(s).

Methods

In a second aspect, the present disclosure provides a method of making an infiltrated three-dimensional article. The method comprises:

a) curing a photopolymerizable composition comprising at least one reactive component and at least one photoinitiator to form an additive manufactured three-dimensional structure of a first polymeric material having an exterior surface and an interior volume;

b) contacting at least a portion the three-dimensional structure with a fluid to form an infiltrated structure; and c) curing or drying the fluid of the infiltrated structure to form an infiltrated three-dimensional article comprising a second polymeric material disposed in at least a portion of the interior volume of the first polymeric material.

Referring to FIG. 5, a flow chart is provided of an exemplary method according to the present disclosure. The method comprises Step 510 to a) selectively cure a photopolymerizable composition comprising at least one reactive component and at least one photoinitiator to form an additive manufactured three-dimensional structure of a first polymeric material having an exterior surface and an interior volume. The method also comprises Step 520 to b) contact at least a portion of the three-dimensional structure with a fluid to form an infiltrated structure. Additionally, the method comprises Step 530 to c) cure or dry the fluid of the infiltrated structure to form an infiltrated three-dimensional article comprising a second polymeric material disposed in at least a portion of the interior volume of the first polymeric material.

In certain embodiments, the method further comprises heating during step b). Heating can, in some cases, improve the infiltration of the fluid into the interior volume of the three-dimensional structure of the first polymeric material.

It is to be understood that the fluid may be in the form of a liquid and/or a vapor during the time of infiltration into the three-dimensional structure of a first polymeric material. The fluid comprises a thermoplastic polymer, a polymerizable composition comprising at least one reactive component, or a combination thereof. The fluid optionally comprises a polymerizable composition comprising at least one ethylenically unsaturated component. In some cases, the polymerizable composition is advantageously a 100% solids liquid (i.e., lacking solvent). More specifically, any of the materials described above with respect to the second polymeric material are suitable to include in the fluid. In some embodiments, the first polymeric material and the second polymeric material are separate networks lacking covalent bonds between each other, which may be more challenging to achieve when instead using methods in which two different materials are included in the same composition at the time of forming a three-dimensional article.

In select embodiments, the three-dimensional structure is partially submerged in the fluid, which may be advantageous when it is desired to infiltrate the fluid into only certain specific locations of the three-dimensional structure. In select embodiments, the three-dimensional structure is fully submerged in the fluid. Full submersion may be advantageous when it is desired to infiltrate the fluid through the entire exterior surface of the three-dimensional structure. Further, a shorter contact time is needed to infiltrate through the entire interior volume when the three-dimensional structure is fully submerged, although it may be possible to achieve complete infiltration through the interior volume starting with partial submersion and allowing the fluid to infiltrate from one surface to an opposing surface.

The total time that the fluid is contacted with the three-dimensional structure is not particularly limited and usually the longer the contact time, the further into the interior volume of the three-dimensional structure of the first polymeric material the fluid infiltrates (e.g., travels). Typically, the fluid is contacted with the three-dimensional structure for a (e.g., total) time of at least 10 minutes, such as 10 minutes or more, 15 minutes or more, 20 minutes or more, 25 minutes or more, 30 minutes or more, 45 minutes or more, 1 hour or more, 1.5 hours or more, 2 hours or more, 2.5 hours or more, 3 hours or more, 3.5 hours or more, 4 hours or more, 5 hours or more, 6 hours or more, 7 hours or more, 8 hours or more, 9 hours or more, 10 hours or more, 11 hours or more, or 12 hours or more; and up to 72 hours, up to 60 hours, up to 48 hours, up to 36 hours, or up to 24 hours.

Following the contact time, the fluid is optionally cured using actinic radiation and/or heat when the fluid comprises at least one polymerizable component. Suitable actinic radiation includes UV radiation, e-beam radiation, visible radiation, or any combination thereof. The skilled practitioner can select a suitable radiation source and range of wavelengths for a particular application without undue experimentation. Suitable conditions for heat curing include, for instance, heating at a temperature in the range of about 75-150° C., for a time ranging from about 10 to 90 minutes (optionally in an inert atmosphere).

The fluid that becomes infiltrated into the three-dimensional article adds to the mass of the final infiltrated article. In some embodiments, the infiltrated three-dimensional article has a mass that is at least 5% greater than a mass of the three-dimensional structure, such as 5% or greater, 10%, 15%, 20%, 25%, 30%, 35%, 40%, or 50% or greater; and 300% or less.

Often, infiltration of the fluid into the three-dimensional structure of the first polymeric material results in a swelling of the three-dimensional structure. For instance, in some embodiments the infiltrated three-dimensional article has a volume that is at least 5% greater than a volume of the three-dimensional structure, for instance 5% or greater, 10%, 15%, 20%, 25%, 30%, 35%, 40%, or 50% or greater; and 500% or less. Knowledge of an extent of swelling can be used to scale down at least a portion of a digital representation (e.g., STL file) of the three-dimensional article to be formed in step a) to compensate for the extent and location of swelling of the three-dimensional structure that will be caused by infiltration of the fluid in step b). Optionally, the scaling down is according to a global scale factor. An example of global scaling down in described in Example 7 below, in which a digital representation of a gummy bear shape was globally scaled down to 70% of desired size of an infiltrated three-dimensional article and infiltration of the fluid results in the desired (100%) size of the final infiltrated three-dimensional article.

It is expected in certain embodiments of the present disclosure that the three-dimensional article will shrink (i.e., reduce in volume) such that the dimensions of the article after optional postcuring will be smaller than expected. For example, a cured article may shrink less than 5% in volume, less than 4%, less than 3%, less than 2%, or even less than 1% in volume. The amount of volume percent shrinkage will not typically result in a significant distortion in the shape of the final object. It is particularly contemplated, therefore, that dimensions in the digital representation of the eventual cured article may be scaled according to a global scale factor to compensate for this shrinkage, e.g., in combination with compensating for swelling of the three-dimensional article during the infiltration of step b).

Figure 7:
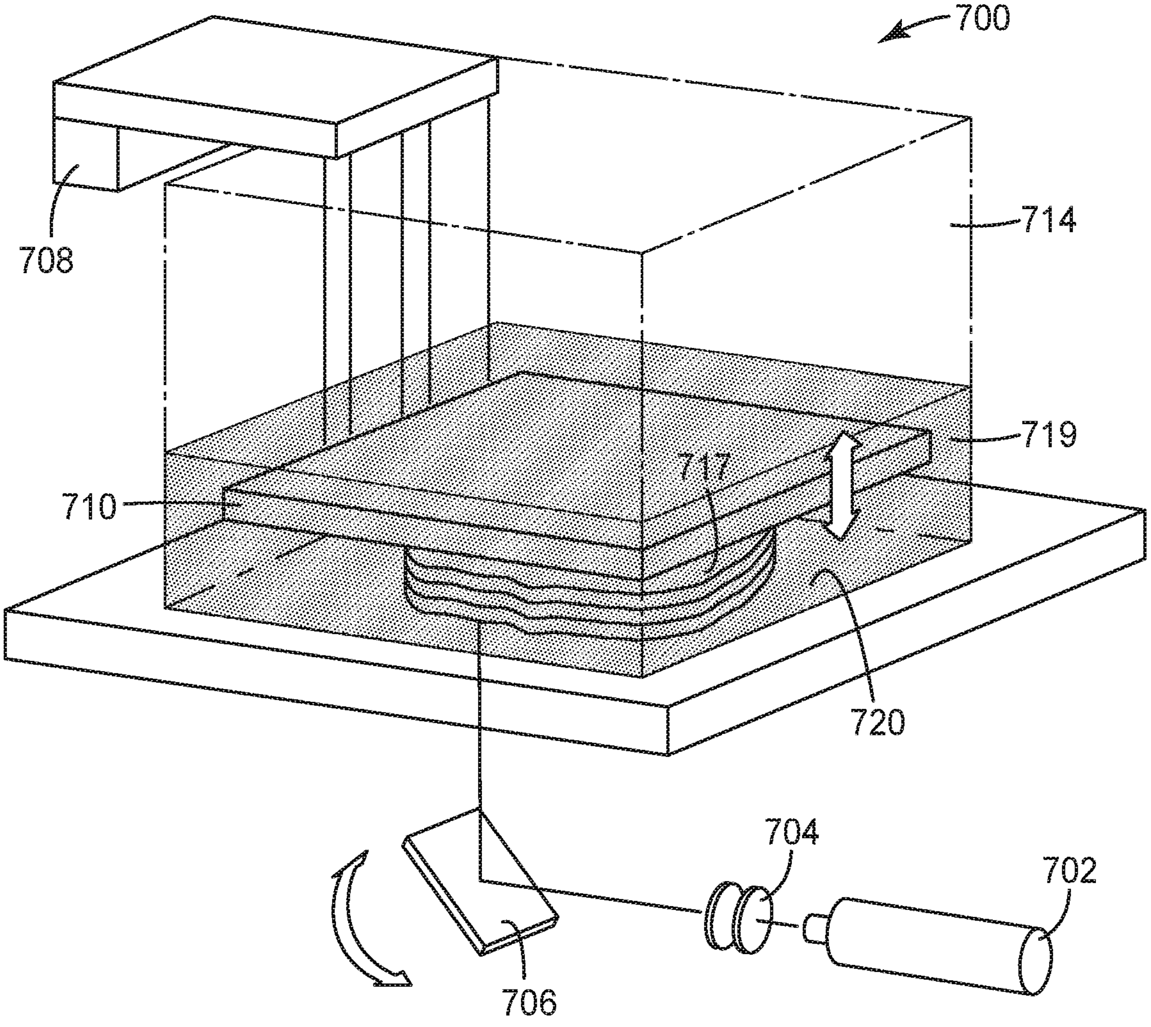
FIG. 7 is a generalized schematic of a stereolithography apparatus.

FIG. 7 shows a stereolithography apparatus ("SLA") that may be used, for instance to form the first polymeric material using photopolymerizable compositions and methods described herein. In general, the apparatus 700 may include a laser 702, optics 704, a steering mirror or lens 706, an elevator 708, and a platform 710, within a vat 714 filled with the photopolymerizable composition 719. In operation, the laser 702 is steered through a wall 720 (e.g., the floor) of the vat 714 and into the photocurable composition to cure a cross-section of the photocurable composition 719 to form an article 717, after which the elevator 708 slightly raises the platform 710 and another cross section is cured. Suitable stereolithography printers include the NextDent 5100 and the FIG. 4, both available from 3D Systems, Rock Hill, SC, and the Asiga PICO PLUS 39, available from Asiga USA, Anaheim Hills, CA.

In some embodiments, vat polymerization with Digital Light Processing ("DLP"), employs a container of curable polymer (e.g., photopolymerizable composition). In a DLP based system, a two-dimensional cross section is projected onto the curable material to cure the desired section of an entire plane transverse to the projected beam at one time. One suitable apparatus for use with photopolymerizable compositions is the Rapid Shape D40 II DLP 3D printer (Rapid Shape GmbH, Heimsheim, Germany). All such curable polymer systems as may be adapted to use with the photopolymerizable compositions described herein are intended to fall within the scope of "vat polymerization" or "stereolithography" systems as used herein. In certain embodiments, an apparatus adapted to be used in a continuous mode may be employed, such as an apparatus commercially available from Carbon 3D, Inc. (Redwood City, CA), for instance as described in U.S. Pat. Nos. 9,205,601 and 9,360,757 (both to DeSimone et al.).

More generally, the photopolymerizable composition is typically cured using actinic radiation, such as UV radiation, e-beam radiation, visible radiation, or any combination thereof. The skilled practitioner can select a suitable radiation source and range of wavelengths for a particular application without undue experimentation.

Data representing a three-dimensional article (e.g., the first polymeric material used for a infiltrated three-dimensional article) may be generated using computer modeling, such as computer aided design (CAD) data. Image data representing the article design can be exported in STL format, or in any other suitable computer processable format, to the additive manufacturing equipment.

Figure 12:
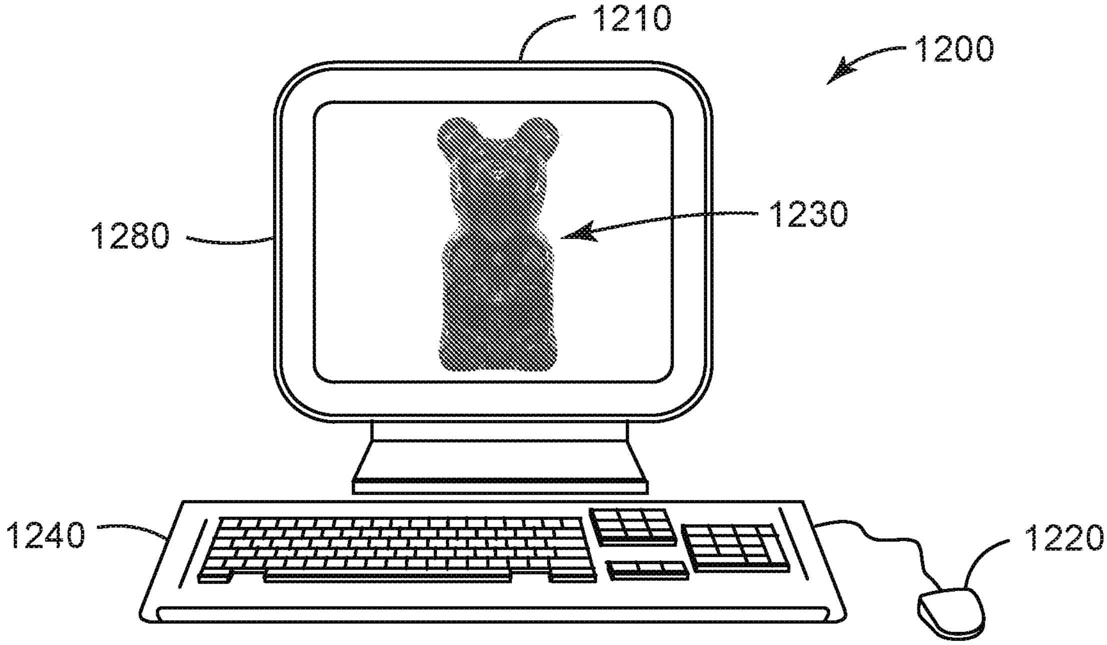
FIG. 12 is a schematic front view of an exemplary computing device 12000.

Often, machine-readable media are provided as part of a computing device. The computing device may have one or more processors, volatile memory (RAM), a device for reading machine-readable media, and input/output devices, such as a display, a keyboard, and a pointing device. Further, a computing device may also include other software, firmware, or combinations thereof, such as an operating system and other application software. A computing device may be, for example, a workstation, a laptop, a personal digital assistant (PDA), a server, a mainframe or any other general-purpose or application-specific computing device. A computing device may read executable software instructions from a computer-readable medium (such as a hard drive, a CD-ROM, or a computer memory), or may receive instructions from another source logically connected to a computer, such as another networked computer. Referring to FIG. 12, a computing device 1200 often includes an internal processor 1280, a display 1210 (e.g., a monitor), and one or more input devices such as a keyboard 1240 and a mouse 1220. In FIG. 12, an article 1230 (e.g., a gummy bear shape) is shown on the display 1210.

Figure 8:
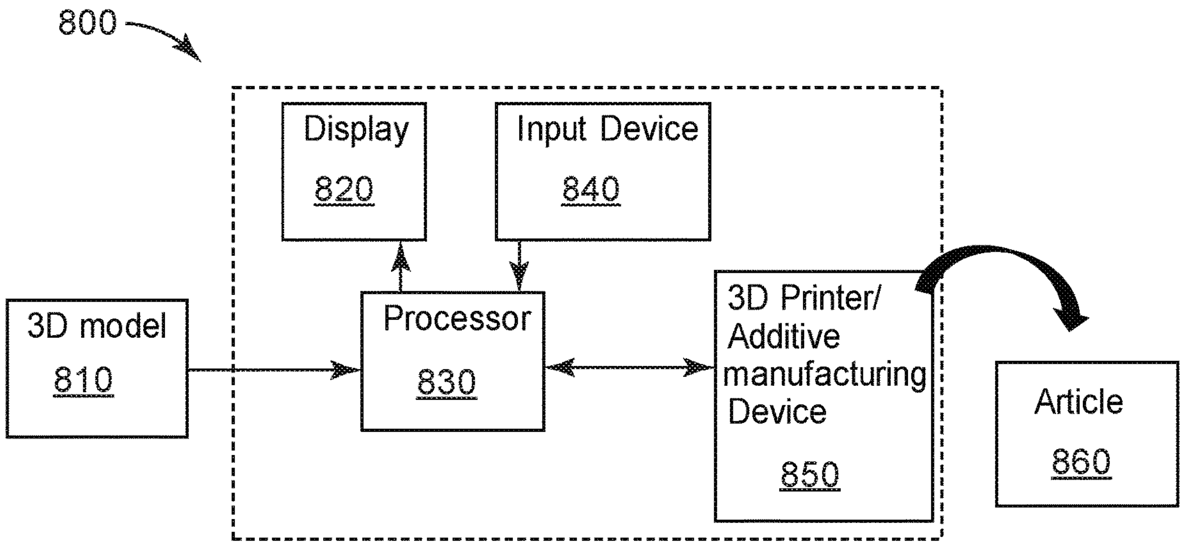
FIG. 8 is a block diagram of a generalized system 800 for additive manufacturing of an article.

Referring to FIG. 8, in certain embodiments, a system 800 is employed in the method of manufacturing an infiltrated three-dimensional article. The system 800 comprises a display 820 that displays a 3D model 810 of an article (e.g., an article 830 as shown on the display 1210 of FIG. 12); and one or more processors 830 that, in response to the 3D model 810 selected by a user, cause a 3D printer/additive manufacturing device 850 to create a physical object of the article 860. Often, an input device 840 (e.g., keyboard and/or mouse) is employed with the display 820 and the at least one processor 830, particularly for the user to select the 3D model 810.

Figure 9:
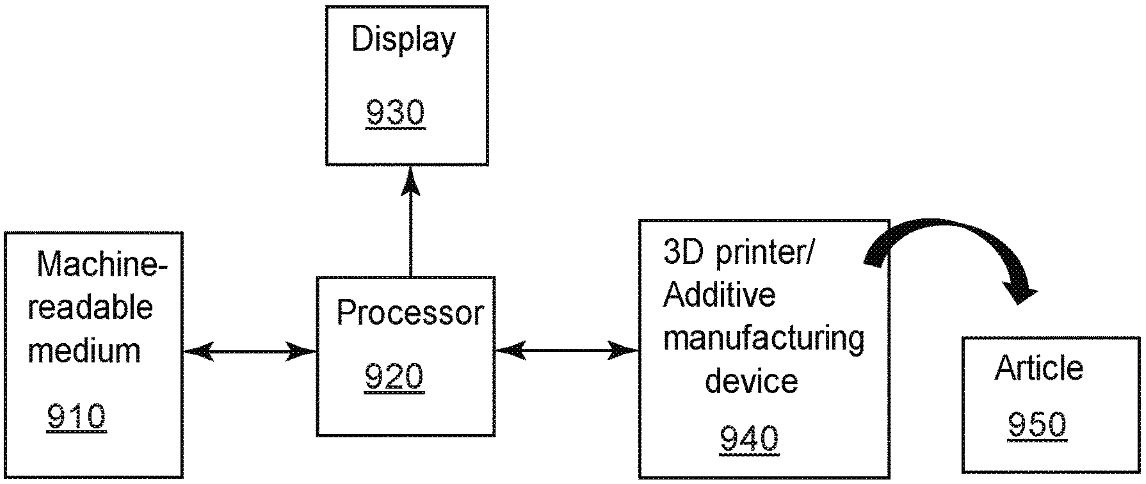
FIG. 9 is a block diagram of a generalized manufacturing process for an article.

Referring to FIG. 9, a processor 920 (or more than one processor) is in communication with each of a machine-readable medium 910 (e.g., a non-transitory medium), a 3D printer/additive manufacturing device 940, and optionally a display 930 for viewing by a user. The 3D printer/additive manufacturing device 940 is configured to make one or more articles 950 based on instructions from the processor 920 providing data representing a 3D model of the article 950 (e.g., an article 1230 as shown on the display 1210 of FIG. 12) from the machine-readable medium 910.

Figure 10:
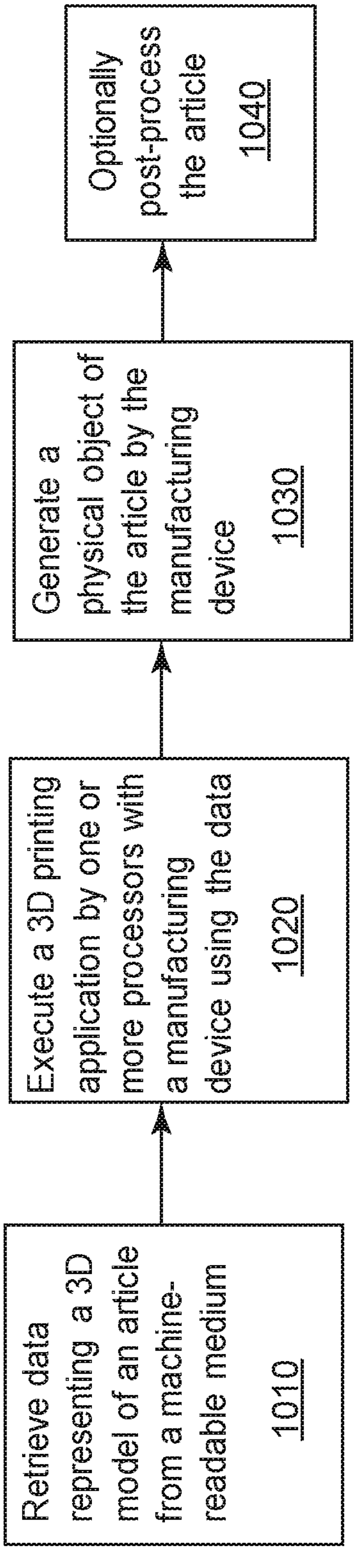
FIG. 10 is a high-level flow chart of an exemplary article manufacturing process.

Referring to FIG. 10, for example and without limitation, an additive manufacturing method comprises retrieving 1010, from a (e.g., non-transitory) machine-readable medium, data representing a 3D model of an article according to at least one embodiment of the present disclosure. The method further includes executing 1020, by one or more processors, an additive manufacturing application interfacing with a manufacturing device using the data; and generating 1030, by the manufacturing device, a physical object of the article. One or more various optional post-processing steps 1040 may be undertaken. Typically, uncured photocurable component is removed from the article, plus the article may further be heat treated or otherwise post-cured. For instance, in some embodiments, the method further comprises, prior to Step c); retrieving, from a non-transitory machine readable medium, data representing a 3D model of the three-dimensional article; and executing, by one or more processors, a 3D printing application interfacing with a manufacturing device using the data to generate a physical object of the three-dimensional article.

Figure 11:
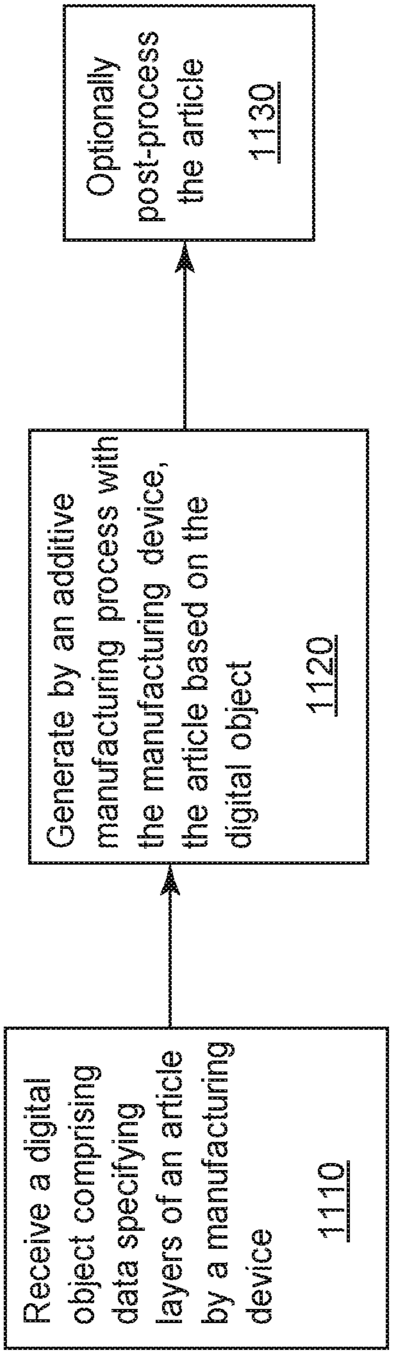
FIG. 11 is a high-level flow chart of an exemplary article additive manufacturing process.

Additionally, referring to FIG. 11, a method of making an article comprises receiving 1110, by a manufacturing device having one or more processors, a digital object comprising data specifying an (e.g., three-dimensional) article; and generating 1120, with the manufacturing device by an additive manufacturing process, the article based on the digital object. Again, the article may undergo one or more steps of post-processing 1130. For instance, in some embodiments, the method further comprises, prior to Step c); receiving, by a manufacturing device having one or more processors, a digital object comprising data specifying the three-dimensional article; and generating, with the manufacturing device by an additive manufacturing process, the three-dimensional article based on the digital object.

Exemplary Embodiments

In a first embodiment, the present disclosure provides an infiltrated three-dimensional article. The three-dimensional article comprises a) a first polymeric material having an exterior surface and an interior volume; and b) a second polymeric material that is a thermoplastic polymer or a reaction product of a polymerizable composition disposed in at least a portion of the interior volume of the first polymeric material to a depth of at least 0.1 millimeters (mm) from the exterior surface.

In a second embodiment, the present disclosure provides an article according to the first embodiment, wherein the second polymeric material comprises a thermoplastic polymer.

In a third embodiment, the present disclosure provides an article according to the second embodiment, wherein the thermoplastic polymer comprises a polyurethane, a polyurea, a polyester, a polyamide, a polyether, a polycarbonate, a polyimide, a polysulphone, a polyphenylene oxide, a polyacrylate, a polymethacrylate, a polyolefin, a styrene, a styrene based random or block copolymer, a chlorinated polymer, a fluorinated polymer, or copolymers of ethylene and chlorotrifluoroethylene.

In a fourth embodiment, the present disclosure provides an article according to the first embodiment, wherein the second polymeric material comprises a reaction product of a polymerizable composition comprising at least one reactive component.

In a fifth embodiment, the present disclosure provides an article according to the fourth embodiment, wherein the polymerizable composition further comprises at least one of a photoinitiator, a thermal initiator, or a cationic initiator.

In a sixth embodiment, the present disclosure provides an article according to the fourth embodiment or the fifth embodiment, wherein the at least one reactive component of the polymerizable composition comprises at least one of a (meth)acryl component, a thiol component and an ene component that is different from the (meth)acryl component, a polyalkylene component, a polyalkylene oxide component, a polyester component, a polycarbonate component, a urethane component, a polyamide component, an epoxide component, an oxetane component, a silicone component, an epoxy component, a cyanate ester component, a natural rubber component, a ring-opening metathesis polymerization component, a click chemistry component, a cyanate ester resin, or precursors to a polyurethane, a polyurea, or a copolymer thereof.

In a seventh embodiment, the present disclosure provides an article according to any of the first through sixth embodiments, wherein the first polymeric material comprises a reaction product of a photopolymerizable composition comprising at least one ethylenically unsaturated component and at least one photoinitiator.

In an eighth embodiment, the present disclosure provides an article according to the seventh embodiment, wherein the at least one ethylenically unsaturated component of the photopolymerizable composition comprises at least one of a (meth)acryl component, a thiol component and an ene component that is different from the (meth)acryl component, a polyalkylene component, a polyalkylene oxide component, a polyester component, a polycarbonate component, a urethane component, a polyamide component, an epoxide component, or an oxetane component.

In a ninth embodiment, the present disclosure provides an article according to the eighth, wherein the at least one ethylenically unsaturated component of the photopolymerizable composition comprises a (meth)acryl component.

In a tenth embodiment, the present disclosure provides an article according to any of the first through ninth embodiments, wherein the second polymeric material is disposed on at least a portion of the exterior surface of the first polymeric material in a form of a layer having a thickness of 500 micrometers or greater.

In an eleventh embodiment, the present disclosure provides an article according to any of the first through tenth embodiments, wherein the second polymeric material is disposed on an entirety of the exterior surface of the first polymeric material in a form of a complete shell surrounding the first polymeric material.

In a twelfth embodiment, the present disclosure provides an article according to any of the first through eleventh embodiments, wherein the second polymeric material is disposed in a portion of the interior volume of the first polymeric material located directly adjacent to at least a portion of the exterior surface of the first polymeric material.

In a thirteenth embodiment, the present disclosure provides an article according to any of the first through twelfth embodiments, wherein the second polymeric material is disposed throughout the interior volume of the first polymeric material.

In a fourteenth embodiment, the present disclosure provides an article according to any of the first through thirteenth embodiments, wherein the second polymeric material has a modulus that is at least 10% different than a modulus of the first polymeric material.

In a fifteenth embodiment, the present disclosure provides an article according to any of the first through fourteenth embodiments, wherein the second polymeric material has a glass transition temperature ($T_g$) that is at least 5 degrees Celsius different than a $T_g$ of the first polymeric material.

In a sixteenth embodiment, the present disclosure provides an article according to any of the first through fifteenth embodiments, wherein the first polymeric material is formed of a plurality of layers directly bonded to each other.

In a seventeenth embodiment, the present disclosure provides an article according to any of the first through sixteenth embodiments, wherein the second polymeric material and the first polymeric material form an interpenetrating polymer network.

In an eighteenth embodiment, the present disclosure provides an article according to any of the first through seventeenth embodiments, wherein the second polymeric material comprises an exterior surface, wherein the article further comprises a third polymeric material disposed on at least a portion of the exterior surface of the second polymeric material.

In a nineteenth embodiment, the present disclosure provides an article according to any of the first through eighteenth embodiments, wherein the second polymeric material has different optical properties than the first polymeric material.

In a twentieth embodiment, the present disclosure provides an article according to any of the first through nineteenth embodiments, wherein the second polymeric material has a different color than the first polymeric material.

In a twenty-first embodiment, the present disclosure provides an article according to any of the first through twentieth embodiments, wherein the second polymeric material has a different refractive index than the first polymeric material.

In a twenty-second embodiment, the present disclosure provides an article according to any of the first through twenty-first embodiments, wherein the second polymeric material has a different transparency than the first polymeric material.

In a twenty-third embodiment, the present disclosure provides an article according to any of the first through twenty-second embodiments, wherein the second polymeric material is a pressure-sensitive adhesive.

In a twenty-fourth embodiment, the present disclosure provides a method of making an infiltrated three-dimensional article. The method comprises a) curing a photopolymerizable composition comprising at least one reactive component and at least one photoinitiator to form an additive manufactured three-dimensional structure of a first polymeric material having an exterior surface and an interior volume. The method further comprises b) contacting at least a portion the three-dimensional structure with a fluid to form an infiltrated structure; and c) curing or drying the fluid of the infiltrated structure to form an infiltrated three-dimensional article comprising a second polymeric material disposed in at least a portion of the interior volume of the first polymeric material.

In a twenty-fifth embodiment, the present disclosure provides a method according to the twenty-fourth embodiment, wherein the fluid is in the form of a liquid or a vapor.

In a twenty-sixth embodiment, the present disclosure provides a method according to the twenty-fourth embodiment or the twenty-fifth embodiment, wherein the fluid comprises a thermoplastic polymer, a polymerizable composition comprising at least one reactive component, or a combination thereof.

In a twenty-seventh embodiment, the present disclosure provides a method according to any of the twenty-fourth through twenty-sixth embodiments, wherein the fluid comprises a polymerizable composition comprising at least one ethylenically unsaturated component and wherein the polymerizable composition is a 100% solids liquid.

In a twenty-eighth embodiment, the present disclosure provides a method according to any of the twenty-fourth through twenty-seventh embodiments, wherein the fluid is contacted with the three-dimensional structure for a time of at least 10 minutes.

In a twenty-ninth embodiment, the present disclosure provides a method according to any of the twenty-fourth through twenty-eighth embodiments, wherein the infiltrated three-dimensional article has a volume that is at least 5% greater than a volume of the three-dimensional structure.

In a thirtieth embodiment, the present disclosure provides a method according to any of the twenty-fourth through twenty-eighth embodiments, wherein the fluid is cured using actinic radiation and/or heat.

In a thirty-first embodiment, the present disclosure provides a method according to any of the twenty-fourth through thirtieth embodiments, further comprising heating during step b).

In a thirty-second embodiment, the present disclosure provides a method according to any of the twenty-fourth through thirty-first embodiments, wherein the three-dimensional structure is partially submerged in the fluid.

In a thirty-third embodiment, the present disclosure provides a method according to any of the twenty-fourth through thirty-first embodiments, wherein the three-dimensional structure is fully submerged in the fluid.

In a thirty-fourth embodiment, the present disclosure provides a method according to any of the twenty-fourth through thirty-third embodiments, wherein the first polymeric material and the second polymeric material are separate networks lacking covalent bonds between each other.

In a thirty-fifth embodiment, the present disclosure provides a method according to any of the twenty-fourth through thirty-fourth embodiments, wherein the infiltrated three-dimensional article has a mass that is at least 5% greater than a mass of the three-dimensional structure.

In a thirty-sixth embodiment, the present disclosure provides a method according to any of the twenty-fourth through thirty-fifth embodiments, wherein a digital representation of the infiltrated three-dimensional article is used in step a) and at least a portion of the digital representation is scaled down to compensate for swelling of the three-dimensional structure caused by infiltration of the fluid in step b).

In a thirty-seventh embodiment, the present disclosure provides a method according to any of the twenty-fourth through thirty-sixth embodiments, wherein the first polymeric material and the second polymeric material have a difference of solubility parameters from each other of 35 $MPa^{1/2}$ or less.

Advantages and embodiments of this invention are further illustrated by the following examples, but the particular materials and amounts thereof recited in these examples, as well as other conditions and details, should not be construed to unduly limit this invention.

EXAMPLES

Unless otherwise noted or apparent from the context, all parts, percentages, ratios, etc. in the Examples and the rest of the specification are by weight. Table 1 (below) lists materials used in the examples and their sources.

TABLE 1

Materials List

| DESIGNATION | DESCRIPTION AND SOURCE |
|---|---|
| Stamp Resin | Obtained as “Photopolymer Stamp Resin” from JMP Rubber Stamp Materials (Mount Vernon, IL). |
| PC Resin | Photopolymerizable resin obtained under the trade designation “PLASCLEAR” from Asiga (Sydney, Australia); reported $T_g$ = 83° C.; obtained from ProtoProducts (Ashland City, TN) |
| VM Resin | Magenta-colored photopolymerizable resin obtained under the trade designation “VEROMAGENTA” resin from Stratasys (Eden Prairie, MN) |

TABLE 1-continued

| Materials List | |
|---|---|
| DESIGNATION | DESCRIPTION AND SOURCE |
| VC Resin | Clear photopolymerizable resin obtained under the trade designation "VEROCLEAR" resin from Stratasys (Eden Prairie, MN); reported $T_g$ is 53° C. |
| EHA | 2-ethylhexyl acrylate used as received from Sigma-Aldrich (St. Louis, MO) |
| AA | Acrylic acid used as received from Alfa Aesar (Haverhill, MA) |
| HDDA | Hexane diol diacrylate used as received from Alfa Aesar |
| IRG-819 | Bis(2,4,6-trimethylbenzoyl)-phenylphosphine oxide obtained under the trade designation "IRGACURE 819" from BASF (Ludwigshafen, Germany) |
| Spray Paint | "RUST-OLEUM" (Vernon Hills, IL) Textured Metallic Black spray paint obtained from Home Depot |
| IBOMA | Isobornyl methacrylate obtained from San Esters Corp (New York, NY) |
| TPO | 2,4,6 trimethylbenzoyldiphenylphosphine oxide photoinitiator obtained under the trade designation "IRGACURE TPO" from BASF |
| BHT | 2,6-di-t-butyl-4-methylphenol obtained from Alfa Aesar |
| T-326 | 2-(5-chloro-2H-benzotriazol-2-yl)-6-(1,1-dimethyl)-4-methylphenol obtained under the trade designation "TINUVIN 326" from BASF |
| C-2050 | A polycarbonate diol of about 2000 MW made with about a 50% (i.e., 5:5) mole ratio of 3-Methyl-1,5-pentanediol: 1,6-hexanediol [(MPD):(HD)], obtained as "KURARAY POLYOL C-2050" from Kuraray Co. Ltd. (Tokyo, Japan) |
| IPDI | Isophorone diisocyanate, equivalent weight 111.11, molecular weight 222.22 g/mole, obtained under trade designation "DESMODUR I" obtained from Covestro LLC (Leverkusen, Germany) |
| XK-672 | Zn-based catalyst obtained under the trade designation "K-KAT XK-672" obtained from King Industries (Norwalk, CT) |
| HEMA | Hydroxyethyl methacrylate obtained from TCI America (Portland, OR) |

Test Methods

3D Printing Method

Printed Examples were printed on an Asiga Max 3D printer (Sydney, Australia) with a LED light source of 385 nanometers (nm). A stereolithography file format (STL file) of 10 millimeter (mm) diameter hemispheres was loaded into the Asiga Composer software. The resin bath of the printer was heated to 40° C. prior to printing. The following settings were used for the printing: slice thickness=50 micrometers (μm); burn in layers=2, burn-in time=10 seconds(s), and exposure time=3 s. After printing, the green (not fully cured) parts were wiped clean of unreacted, liquid resin using a paper towel. The mass and dimensions of the parts were measured by caliper and recorded at this point. The parts were then postcured in a CLEARSTONE CA3200 UV-chamber (Hopkins, MN). The chamber was first purged with nitrogen for 1 minute, then the parts were simultaneously exposed to 365 nm, 385 nm, and 405 nm LED irradiation for 5 minutes.

Casting Method

Cast Examples and Comparative Examples were produced by a casting method. The liquid resin was poured into an open-faced silicone mold, filling cavities of dimensions 25.4 mm×9.5 mm×1.2 mm. A transparent PET film was then placed on top of the silicone mold, sealing the liquid resin inside. A plastic roller was used to smooth and flatten the resin within the mold. The mold was then placed in a CLEARSTONE CA3200 UV-chamber. The chamber was first purged with nitrogen for 1 minute, then the LEDs irradiated simultaneously with 365 nm, 385 nm, and 405 nm LED light for 5 minutes. After this, the now solid samples were demolded and used for further evaluation.

Infiltration Method

Initial mass and volume measurements were taken and record for each printed or cast sample undergoing subsequent infiltration. The final printed and cast samples were placed in a sealed amber bottle filled with the infiltrating fluid according to the infiltration times listed in the tables below. The bottle remained sealed for the duration of infiltration. After removing the infiltrated parts from the bottle, the parts were weighed and had their dimensions recorded. Mass and Volume Increase were calculated as:

$$\text{Mass Increase} = \frac{(\text{final infiltrated mass} - \text{initial mass})}{\text{initial mass}} * 100$$

$$\text{Volumn Increase} = \frac{(\text{final infiltrated volume} - \text{initial volume})}{\text{initial volume}} * 100$$

Shore A Hardness Measurement Test Method

Shore A hardness measurements were taken manually in accordance with ASTM D2240-(2021), "Standard Test Method for Rubber Property—Durometer Hardness," Section 9.2, using a Type A durometer from the Shore Instrument & Manufacturing Company, Incorporated (New York, NY), serial number 89731.

EXAMPLES

Preparatory Examples 1 to 3 (PE-1 to PE-3)

PE-1 was produced as a generic pressure sensitive adhesive formulation. 10 parts AA was added to 90 parts EHA in an amber bottle and stirred for 1 minute. To this, 0.2 parts of HDDA was added and again stirred for 1 minute. Finally, 0.2 parts of IRG-819 were added to the mixture and the bottle was placed on a roller for 24 hours to allow the IRG-819 to fully dissolve.

PE-2 was composed of IBOMA containing 1 wt. % TPO. The TPO was added to IBOMA in an amber bottle and placed on a roller for 24 hours to allow the TPO to fully dissolve.

Synthesis of PE-3 was prepared as follows. A 12 liter (L) three-necked round-bottom flask was charged with 55° C.

oven-heated 2198.4 grams (g) C-2050, 35 496.37 g IPDI, 1.20 g BHT, and 0.75 g XK-672. The reaction was heated under dry air to an internal setpoint of 105° C. (temperature reached 116° C. at about 37 minutes). At 40 minutes 305.23 g HEMA was added via an addition funnel at a steady rate over 1 hour and 3 minutes. The reaction was heated for an additional 5 hours at 105° C., then an aliquot was checked by Fourier transform infrared spectroscopy (FTIR) and found to have no —NCO peak at 2265 cm-1 and the product was isolated as a clear, viscous material.

Preparatory Example 4 (PE-4): Puma Resin

A polyurethane methacrylate resin containing 55 parts by weight PE-3 (see preparation method described above), 45 parts IBOMA, 2 parts TPO, 0.025 parts BHT, and 0.25 parts "TINUVIN 326" were placed in an amber bottle and stirred for 1 minute. The bottle was placed on a roller for 24 hours.

Example Preparation

See Tables 2-4 for details on printed versus cast parts, the resins used, infiltrating fluids, and temperatures during infiltration for the following examples (EX) and comparative examples (CE).

TABLE 2

| EXAMPLE | EX-1 | EX-2 | EX-3 | CE-A |
|---|---|---|---|---|
| Printed or cast sample | Printed | Cast | Cast | Cast |
| First polymeric material | Stamp resin | Stamp resin | PC Resin | PC Resin |
| Infiltrating fluid | VM Resin | VM Resin | VM Resin | VM Resin |
| Temperature during infiltration | 25° C. | 25° C. | 25° C. | 100° C. |

TABLE 3

| EXAMPLE | EX-4 | EX-5 | EX-6 | EX-7 |
|---|---|---|---|---|
| Printed or cast sample | Printed | Cast | Cast | Printed |
| First polymeric material | Stamp resin | Stamp resin | PUMA Resin | Stamp resin |
| Infiltrating fluid | PE-1 | PE-2 | PE-2 | PE-2 |
| Temperature during infiltration | 25° C. | 25° C. | 25° C. | 25° C. |

TABLE 4

| EXAMPLE | EX-8 | EX-9 | CE-B |
|---|---|---|---|
| Printed or cast sample | Cast | Cast | Cast |
| First polymeric material | VC Resin | VC Resin | Stamp resin |
| Infiltrating fluid | VM Resin | VM Resin | Spray Paint |
| Temperature during infiltration | 25° C. | 100° C. | 25° C. |

TABLE 5

Mass and volume increase at various infiltration durations for EX-1

| | Infiltration Time with VM Resin | | | | |
|---|---|---|---|---|---|
| | 1 hour | 15 hours | 24 hours | 48 hours | 96 hours |
| Mass increase, % | 6.4 | 24.7 | 32.0 | 47.3 | 100.9 |
| Volume increase, % | 8.4 | 18.7 | 25.9 | 33.3 | 124.9 |

Table 6 shows a comparison of infiltration of printed versus cast parts. Two rectangular EX-1 parts were printed. One part received no subsequent UV postcure and one part did. Next, EX-2 samples were cast and UV cured with the same rectangular dimensions. Table 6 compares the infiltration of each of these samples and shows the EX-1 with postcure increased mass similarly to the cast EX-2 part.

TABLE 6

Comparison of parts that were printed (with no postcure), printed (with UV postcure), and cast after 1 hour infiltration

| | EX-1 rectangle (no postcure) | EX-1 rectangle + postcure | EX-2 rectangle |
|---|---|---|---|
| Infiltration time with VM Resin | 1 hour | 1 hour | 1 hour |
| Mass increase, % | 18.4 | 13.1 | 12.4 |
| Volume increase, % | 15.7 | 10.8 | 20.2 |

Example EX-4 was printed as a gummy bear shape from Stamp resin. This example had a portion of its surface exposed to the infiltrating PSA resin (PE-1) and a portion not exposed to the resin. The "back" of the bear was not exposed to the resin, the rest of the surface was submerged in the resin for 1 hour and was infiltrated. After infiltration, the part was wiped clean of excess resin with a paper towel and cured in the Clearstone UV chamber as described above. Once cured, this sample demonstrated pressure sensitive adhesion on the surfaces exposed to resin and showed no noticeable adhesion on the surfaces that were not infiltrated. This was demonstrated in two ways. First, the bear was pressed onto a small piece of paper (approximately 2 inches×2 inches) and then lifted several inches. When one of the infiltrated surfaces contacted the paper, the paper stuck to the part and lifted off the tabletop. When the non-infiltrated surface contacted the paper, no adhesion occurred, and the paper remained on the tabletop. As a second demonstration, Example EX-4 was pressed onto the smooth, vertical surface of a metal cabinet. When one of the infiltrated surfaces contacted the vertical cabinet, the part stuck and would stay in place for at least several seconds. When the non-infiltrated surface contacted the vertical cabinet, the part showed no noticeable adhesion and fell from the surface immediately.

TABLE 7

Mass and volume increase of infiltrating stamp resin with PSA resin

| | EX-4 | |
|---|---|---|
| Infiltration time with PE-1 | 1 hour | 24 hours |
| Mass increase, % | 102.4 | 295.2 |
| Volume increase, % | 132.7 | 316.1 |

Table 8 shows that a change in hardness can be imparted by an infiltrated and subsequently cured monomer. EX-5 shows a low hardness polymer infiltrated with a high hardness monomer. After 2 days of infiltration and a UV postcure, the sample hardness increased. Sample EX-6 was a high hardness polymer infiltrated with a similar hardness monomer. In this example, no significant hardness change was observed.

TABLE 8

Shore A hardness EX-5 and EX-6 before and after infiltration and UV postcure. Hardness values are Average ± SD of 5 measurements.

| | EX-5 | EX-6 |
|---|---|---|
| Infiltrating fluid | PE-2 | PE-2 |
| Infiltration time | 48 hours | 48 hours |
| Shore A hardness before infiltration | 65.7 ± 0.6 | 100 ± 0.9 |
| Shore A hardness after infiltration and UV postcure | 97.3 ± 1.2 | 97.5 ± 0.9 |

Table 9 shows the effect of heating the resin during infiltration. Infiltration of VC Resin ($T_g$=53° C.) at 25° C. showed no appreciable mass or volume increase after either 1 or 24 hours. By placing the infiltration bottle into a 100° C. oven during infiltration, however, infiltration was observed at both 1 hour and 24 hour timepoints. Comparative example CE-A ($T_g$=83° C.) was also placed in the 100° C. oven for an hour, after removal though there was no observable mass or volume increase from infiltration.

TABLE 9

Comparing infiltration at 25° C. (EX-8) and 100° C. (EX-9) of a 53° C. $T_g$ polymer

| | EX-8 | EX-8 | EX-9 | EX-9 |
|---|---|---|---|---|
| Infiltrating fluid | VC Resin | VC Resin | VC Resin | VC Resin |
| Infiltration time | 1 hour | 24 hours | 1 hour | 24 hours |
| Mass increase, % | 0.4 | 0 | 3.6 | 20.2 |
| Volume increase, % | 0 | 0 | 3.8 | 21.1 |

Comparative Example CE-B was coated with spray paint to compare this coating method to infiltration. The spray paint was sprayed onto each side of CE-B from a distance of approximately 6 inches and was applied for a duration of approximately 2 seconds. After allowing the paint to dry for 30 minutes, the sample was flipped over and spray paint was applied to the other side from a distance of approximately 6 inches and was applied for a duration of approximately 2 seconds. The paint was again allowed to dry for 30 minutes then the mass and dimensions were recorded.

The mass and volume increase of an infiltrated sample (EX-1) and the spray-painted sample (CE-B) were similar. When examining sample cross-sections, however, the infiltrated shell was much thicker (>0.5 mm) than the spray-painted shell (0.1-0.2 mm). The spray paint also formed a clear interface around the printed sample, where the infiltration formed a clear gradient of a shell around the interior of the part.

TABLE 10

| | EX-1 | CE-B |
|---|---|---|
| Infiltrating fluid | VM Resin | Spray Paint |
| Infiltration time | 1 hour | |
| Mass increase, % | 12.4 | 7.3 |
| Volume increase, % | 20.2 | 18.4 |

EX-7 was a gummy bear shape printed at an intended scale (i.e., part 650*a* in FIG. 6*a*) and also at a smaller, compensated scale (i.e., part 650*b* in FIG. 6*b*). The compensation was added by uniformly scaling the shape down to 70%. An interior-directed offset could also be used for compensation. After 2 days infiltration, the part had swelled to the intended part size (i.e., infiltrated three-dimensional article 600*c* of FIG. 6*c*).

Foreseeable modifications and alterations of this invention will be apparent to those skilled in the art without departing from the scope and spirit of this invention. This invention should not be restricted to the embodiments that are set forth in this application for illustrative purposes.

What is claimed is:

1. An infiltrated three-dimensional article comprising:

a) a first polymeric material having an exterior surface and an interior volume; and b) a second polymeric material that is a reaction product of a polymerizable composition comprising at least one (meth)acryl component, the reaction product disposed in at least a portion of the interior volume of the first polymeric material to a depth of at least 0.1 millimeters (mm) from the exterior surface, wherein the second polymeric material is disposed on at least a portion of the exterior surface of the first polymeric material in a form of a layer having a thickness of 500 micrometers or greater.

2. The article of claim 1, wherein the first polymeric material comprises a reaction product of a photopolymerizable composition comprising at least one ethylenically unsaturated component and at least one photoinitiator.

3. The article of claim 1, wherein the second polymeric material is disposed on at least a portion of the exterior surface of the first polymeric material in a form of a layer having a thickness of 600 micrometers or greater.

4. The article of claim 1, wherein the second polymeric material is disposed on an entirety of the exterior surface of the first polymeric material in a form of a complete shell surrounding the first polymeric material.

5. The article of claim 1, wherein the second polymeric material is disposed in a portion of the interior volume of the first polymeric material located directly adjacent to at least a portion of the exterior surface of the first polymeric material.

6. The article of claim 1, wherein the second polymeric material is disposed throughout the interior volume of the first polymeric material.

7. The article of claim 1, wherein the second polymeric material has a modulus that is at least 10% different than a modulus of the first polymeric material.

8. The article of claim 1, wherein the second polymeric material has a glass transition temperature ($T_g$) that is at least 5 degrees Celsius different than a $T_g$ of the first polymeric material.

9. The article of claim 1, wherein the second polymeric material and the first polymeric material form an interpenetrating polymer network.

10. The article of claim 1, wherein the second polymeric material has different optical properties than the first polymeric material.

11. The article of claim 1, wherein the second polymeric material has at least one of a different color, a different refractive index, or a different transparency, than the first polymeric material.

12. The article of claim 1, wherein the second polymeric material is a pressure-sensitive adhesive.

13. A method of making an infiltrated three-dimensional article of claim 1, the method comprising:

a) selectively curing a photopolymerizable composition comprising at least one reactive component and at least one photoinitiator to form an additive manufactured three-dimensional structure of a first polymeric material having an exterior surface and an interior volume;

b) contacting at least a portion of the three-dimensional structure with a polymerizable composition comprising at least one meth(acrylate) component to form an infiltrated structure; and c) curing the polymerizable composition of the infiltrated structure to form an infiltrated three-dimensional article comprising a second polymeric material disposed in at least a portion of the interior volume of the first polymeric material, wherein the second polymeric material is disposed on at least a portion of the exterior surface of the first polymeric material in a form of a layer having a thickness of 500 micrometers or greater.

14. The method of claim 13, wherein the polymerizable composition is a 100% solids liquid.

15. The method of claim 13, wherein the contacting comprises fully submerging the three-dimensional structure in the polymerizable composition.

16. The method of claim 13, wherein the first polymeric material and the second polymeric material are separate networks lacking covalent bonds between each other.

17. The method of claim 13, wherein a digital representation of the infiltrated three-dimensional article is used in step a) and at least a portion of the digital representation is scaled down to compensate for swelling of the three-dimensional structure caused by infiltration of the polymerizable composition in step b).

* * * * *